United States Patent
Ancona et al.

(10) Patent No.: US 6,659,633 B2
(45) Date of Patent: Dec. 9, 2003

(54) MIXER/SIFTER

(75) Inventors: Bruce Ancona, New York, NY (US); Robert A. Varakian, Edgewater, NJ (US)

(73) Assignee: Salton, Inc., Lake Forest, IL (US)

( * ) Notice: Subject to any disclaimer, the term of this patent is extended or adjusted under 35 U.S.C. 154(b) by 41 days.

(21) Appl. No.: 09/836,635

(22) Filed: Apr. 17, 2001

(65) Prior Publication Data

US 2002/0149994 A1 Oct. 17, 2002

(51) Int. Cl.[7] .................................................. A47J 43/06
(52) U.S. Cl. ....................... 366/129; 366/197; 366/349; 99/452
(58) Field of Search ................................ 202/233, 235; 99/452; 366/129, 130, 197, 349; D7/667

(56) References Cited

U.S. PATENT DOCUMENTS

| | | | |
|---|---|---|---|
| 2,048,183 A | * | 7/1936 | Dormeyer |
| 2,074,162 A | * | 3/1937 | Bowman |
| 2,521,034 A | * | 9/1950 | Bond |
| 2,537,852 A | * | 1/1951 | Peterson |
| 3,063,563 A | * | 11/1962 | Winchell |
| 3,279,265 A | * | 10/1966 | Braun et al. |
| 3,465,800 A | * | 9/1969 | Michaelis |
| 4,534,858 A | * | 8/1985 | Aldrich et al. .............. 209/233 |

* cited by examiner

*Primary Examiner*—Joseph Drodge
(74) *Attorney, Agent, or Firm*—Sonnenschein Nath & Rosenthal

(57) ABSTRACT

A mixer/sifter combination includes an electric, hand mixer together with a sifter attachment that is designed to be coupled to the mixer via the mixer's aperture that rotates a typical beater so that the mixer can be used to perform sifting functions. The sifter attachment includes a coupler rod that connects to the mixer, various gears that reduce the rate of rotation of a sifter beater attached to the gears and disposed within a sifter cup of the sifter attachment.

16 Claims, 3 Drawing Sheets

MIXER/SIFTER

FIELD OF THE INVENTION

The present invention relates generally to kitchen appliances and, more particularly, to a mixer/sifter combination and also to a sifter attachment for use with an electric hand mixer.

BACKGROUND OF THE INVENTION

Electric hand mixers are well known. These devices enable users to mix items in a bowl in an easy and relatively effort free manner. Electric hand mixers most commonly are used during cooking and baking activities. Most common hand mixers utilize detachable beaters for easy cleaning and storage.

SUMMARY OF THE INVENTION

It is an object of the present invention to provide a mixer/sifter combination device which performs sifting in a convenient and easy to use manner.

It is another object of the present invention to provide a sifter attachment for an electric hand held mixer which likewise performs sifting in a convenient and easy to use manner.

Various other objects, advantages and features of the present invention will become readily apparent to those of ordinary skill in the art, and the novel features will be particularly pointed out in the appended claims.

In accordance with an embodiment of the present invention, a mixer/sifter combination is provided that includes a mixer that can receive an element to be rotated (e.g., a beater) and to operatively rotate that element. The combination further includes a sifter attachment that can be inserted into the mixer and that sifts a substance when the mixer is operated.

As an aspect of the invention, the sifter attachment includes a coupler rod that is inserted into the mixer, and a sifter beater that is operatively connected to the coupler rod.

As a feature of this aspect, the sifter attachment includes a gear mechanism with a first end coupled to the coupler rod and a second end coupled to the sifter beater.

As another feature, the gear mechanism is adapted to rotate the sifter beater at a rate of rotation less than the rate at which the mixer rotates the coupler rod.

As another aspect of the invention, the sifter attachment includes a sifter cup for holding the substance to be sifted, and the sifter beater is disposed within the sifter cup.

As a further aspect of the invention, the mixer includes a bottom surface with an aperture into which a beater can be inserted, and the sifter attachment includes a coupler rod with an end identical to the end of the beater so that the coupler rod can be inserted into the aperture of the mixer.

As an additional aspect, the sifter attachment includes a screen disposed at the bottom of the sifter cup through which the substance passes when it is sifted, and the sifter beater is disposed within and near the bottom of the sifter cup.

As a further aspect of the present invention, the bottom surface of the mixer includes two surfaces, a first bottom surface and a second bottom surface that protrudes from the center of the first bottom surface. The aperture of the mixer is disposed in the second bottom surface, and the sifter attachment includes a front plate with two surfaces, a first front surface and a second front surface that is recessed from the center of the first front surface. Respective sizes of the first and second bottom surfaces of the mixer correspond to respective sizes of the first and second front surfaces of the sifter attachment so that the bottom surface of the mixer can abut against the front plate of the sifter attachment. The coupler rod extends through an aperture in the second front surface of the sifter attachment at the position that corresponds to the position of the aperture in the second bottom surface of the mixer.

As an addition aspect of the invention, the mixer is an electric hand mixer.

In accordance with another embodiment of the present invention, a sifter attachment is provided to attach to a typical mixer. The sifter attachment includes a coupler rod that can be inserted into the mixer, and a sifter beater that is operatively connected to the coupler rod and which performs the sifting function.

As an aspect of this embodiment, the sifter attachment includes a front plate that abuts against the bottom surface of the mixer, and the coupler rod has an end that can be received in an aperture of the mixer that is disposed in the mixer's bottom surface. The front plate of the sifter attachment also includes an aperture through which the end of the coupler rod extends, and the position of the aperture in the front plate of the sifter corresponds to the position of the aperture in the bottom surface of the mixer.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE INVENTION

The mixer/sifter of the present invention is comprised of two components, an electric mixer unit and a sifter attachment unit (or simply, sifter attachment). The present invention also is directed to a sifter attachment designed for use with existing electric hand mixers.

Figure 1:
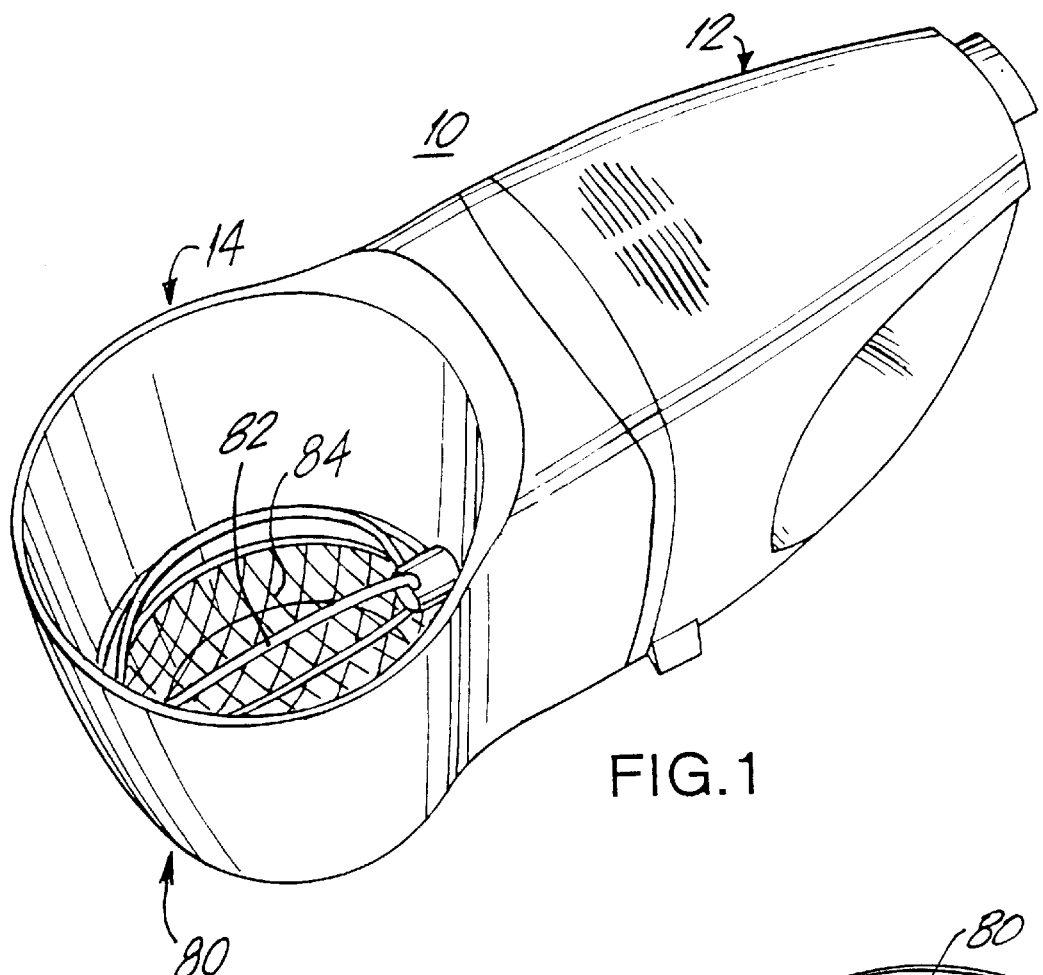
FIG. 1 is a perspective view of the mixer/sifter of the present invention.
Figure 2:
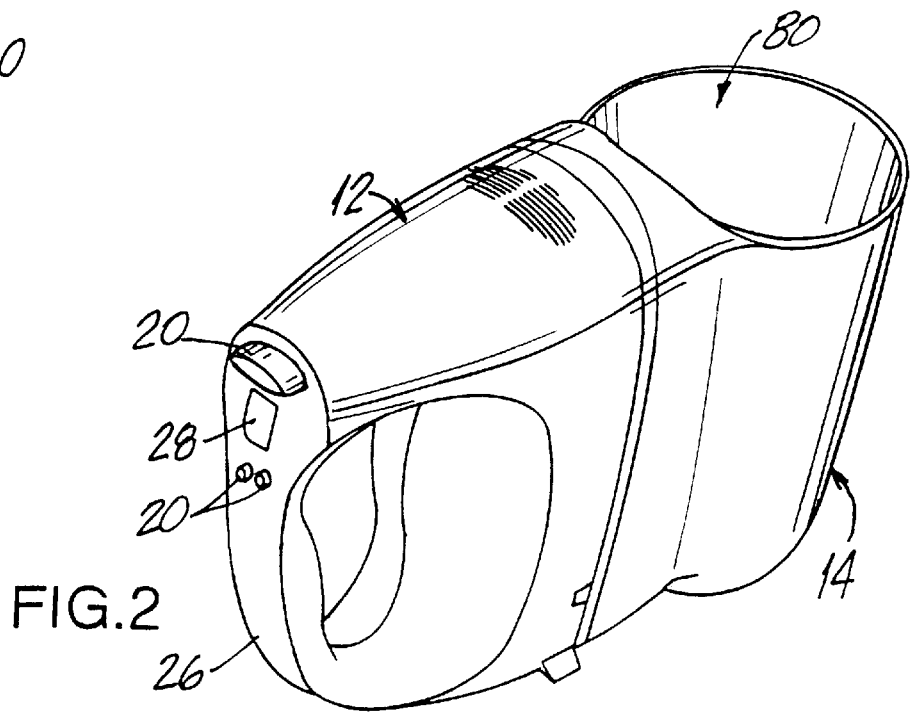
FIG. 2 is another perspective view of the mixer/sifter of the present invention.
Figure 3:
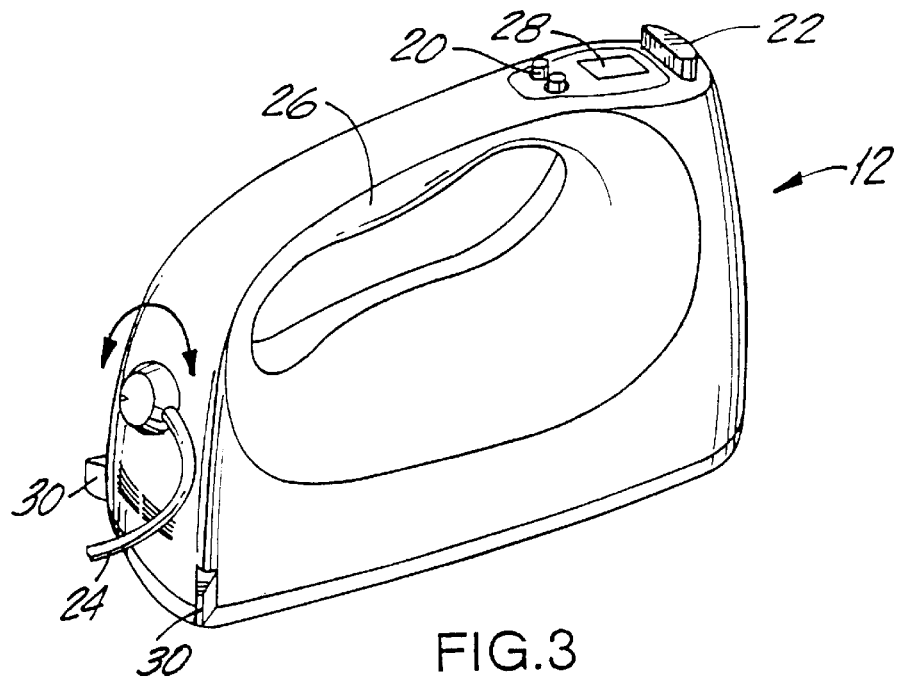
FIG. 3 is a schematic illustration of the electric mixer portion without the sifter attachment connected, in accordance with the present invention.
Figure 4:
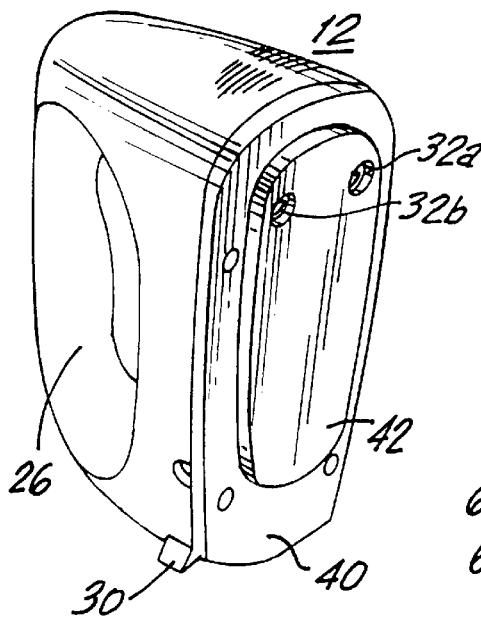
FIG. 4 is another view of the mixer portion of the present invention.

FIGS. 1 and 2 of the drawings schematically illustrate the mixer/sifter combination 10 of the present invention. Mixer/sifter 10 includes an electric mixer 12 and a sifter attachment 14. Mixer 12, shown by itself in FIGS. 3 and 4, includes features and structure that exist in typical electric hand mixers. For example, hand mixer 12 includes speed control and on/off buttons 20, an eject button 22, a power cord 24, a handle 26, an LCD display 28 and feet 30. These features are known in the art and thus descriptions of their operation and design are omitted herein except where necessary for an understanding of the present invention.

Figure 6:
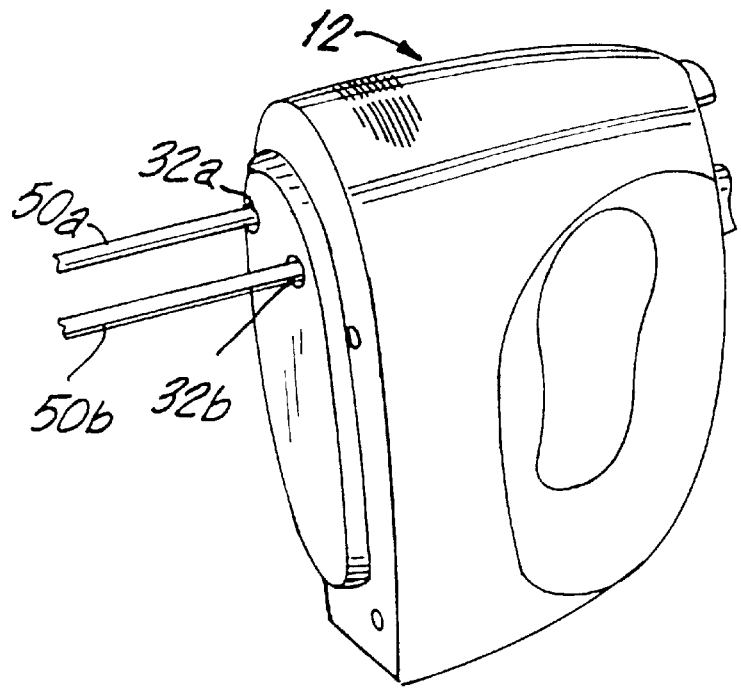
FIG. 6 is another view of the mixer portion of the present invention, partially showing beaters attached thereto.

Mixer 12 of the present invention further includes a bottom surface 40, a surface 42 that protrudes from bottom surface 40 and apertures 32*a* and 32*b* disposed within surface 42 (see FIG. 4) that receive typical beaters as well as the sifter attachment of the present invention. Beaters 50*a* and 50*b*, partially shown in FIG. 6, are typical beaters in the art and can be attached to mixer 12 by inserting them into apertures 32*a* and 32*b*. The specific structure, design and operation of apertures 32*a*, 32*b*, as wells as the internal design thereof, and beaters 50*a* and 50*b* can be that of any existing hand held electric mixer/beater. When beaters 50*a* and 50*b* are inserted into apertures 32*a* and 32*b*, mixer 12 of the present invention operates in a manner identical to existing mixers. Likewise, buttons 20 and LCD display 28 operate in a manner well known in the art and their construction, design and operation are the same as that of existing electric hand mixers. Thus, further description thereof is omitted herein except where necessary for an understanding of the present invention. Moreover, mixer 12 includes a motor and additional internal components necessary for its operation, and such components are well known in the art. The internal structure and design of mixer 12 is not pertinent to the present invention. Eject button 22 operates to eject the beaters when depressed, in a manner well known.

Figure 5:
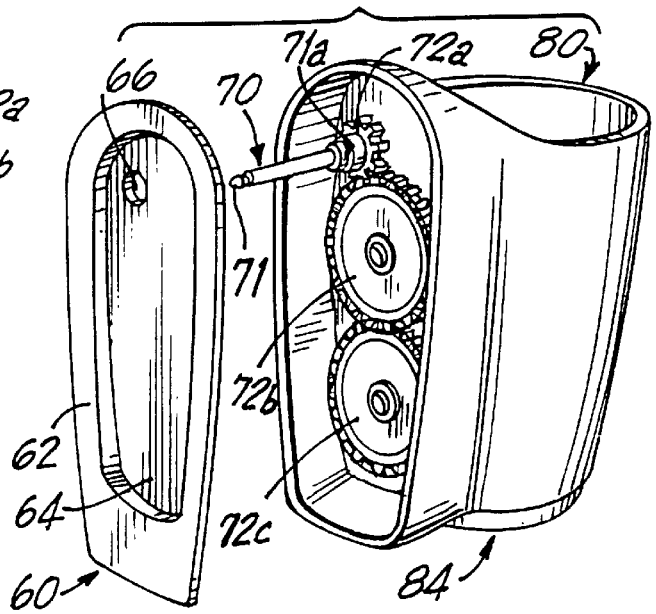
FIG. 5 is a perspective, partially exploded view of the sifter attachment of the present invention.

In accordance with the present invention, mixer 12 can be coupled to sifter attachment 14, which is shown partially exploded in FIG. 5. As previously mentioned with reference to FIG. 4, mixer 12 includes bottom surfaces 40 and 42. Surface 42 is provided to facilitate 20 coupling to sifter attachment 14. Sifter attachment 14 includes, as shown in FIG. 5, a front plate 60, various gear mechanisms and container portion 80. Front plate 60 includes a front surface 62, a recessed surface 64 and an aperture 66 through which a coupler rod 70 extends.

To connect sifter attachment 14 to mixer 12, an end 71 of coupler rod 70 of the sifter attachment is inserted into the mixer's aperture 32*a* until rod 70 is locked in place. Coupler rod 70 has a size and shape equivalent to that of the ends of beaters 50*a* and 50*b* (FIG. 6), that is, that part of beaters 50*a* and 50*b* that are inserted into apertures 32*a* and 32*b*. Thus, end 71 of rod 70 is inserted into and held by the mixer in a manner identical to how beaters 50*a* and 50*b* are inserted and held. When sifter attachment 14 is coupled to mixer 12, front wall 62 of the sifter attachment abuts against bottom surface 40 of the mixer and, similarly, recessed surface 64 of the sifter attachment abuts against surface 42 of the mixer. Protruding surface 42 in connection with the recessed area defined by surface 64 operate to stabilize and support the sifter attachment during use, although it is possible for the sifter attachment to be stabilized in another manner known in the art. However, the design described herein and shown in FIGS. 4 and 5 of the drawings results in an attractive design, proper coupling of the parts, and proper support of the sifter attachment onto the mixer, all without the need for additional attachment devices.

Figure 7:
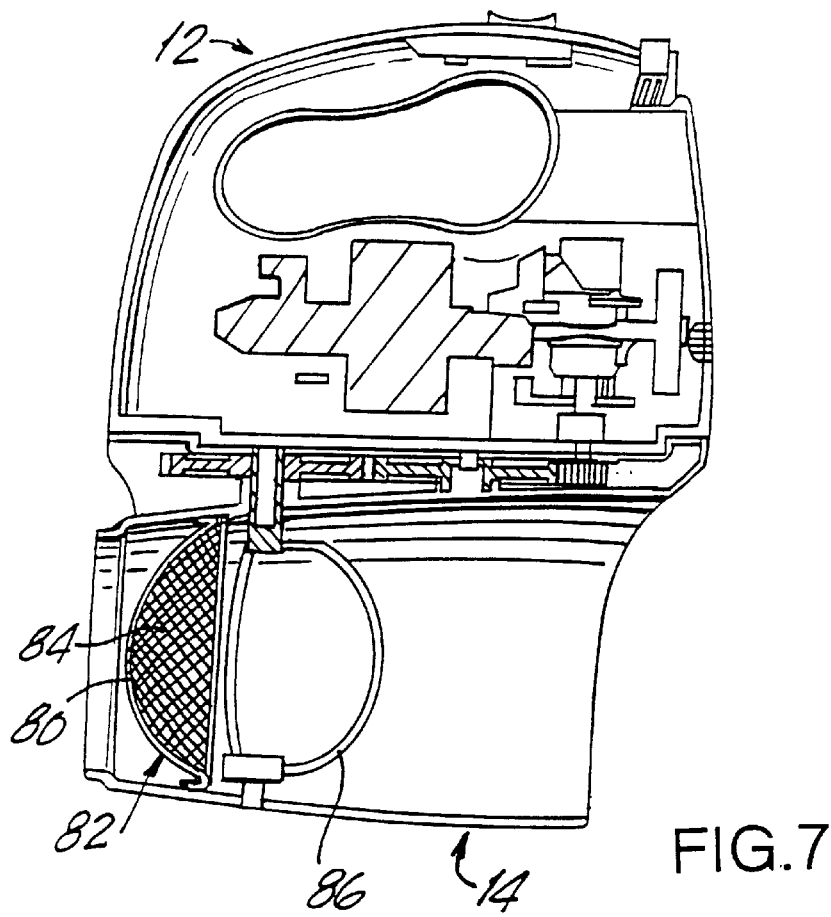
FIG. 7 is a phantom view of the mixer/sifter of the present invention.

As previously mentioned, sifter attachment 14 also includes various gear mechanisms and container portion 80 (also identified herein as a sifter cup). The gear mechanism of the sifter attachment includes coupler rod 70 with coupler rod end 71, which as previously mentioned is inserted into aperture 32*a* of mixer 12. The other end 71*a* of coupler rod 70 is directly coupled to a first gear 72*a* so that gear 72*a* is driven to rotate when mixer 12 is utilized with the sifter attachment. Gear 72*a* is disposed adjacent to a second gear 72*b* which in turn is disposed adjacent to a third gear 72*c*. Gear 72*a* drives gear 72*b* which in turn drives gear 72*c*. A sifter beater 82, shown in FIGS. 1 and 7, is coupled to and extends from third gear 72*c* so that sifter beater 82 is driven to rotate as gear 72*c* rotates. As can be appreciated, gears 72*a*, 72*b* and 72*c*, along with coupler rod 70 driven by mixer 12, collectively operate to drive sifter beater 82 in accordance with the present invention. Moreover, the gears of the sifter attachment are appropriately sized to drive sifter beater 82 at a rate of rotation best suitable for performing sifting functions, which generally is substantially slower than the rate at which coupler rod 70, as well as beaters 50*a*, 50*b* when connected, is driven to rotate. Still further, the gear mechanism enables sifter beater 82 to be disposed near the bottom of sifter cup 80, as shown in FIG. 1.

With reference to FIG. 7, sifter beater 82 is designed to include a number of curved blades 86 similar to that of existing sifters. Of course, other blade designs and the number of blades may vary as that shown herein. Sifter attachment 14 also includes a screen 84 at the bottom of sifter cup 80 to facilitate the sifting feature of the sifter attachment, and the shape, size and design of screen 84 can be the same as that of any suitable screens used within existing sifters. Finally, the gear mechanism (including gears 72*a*, 72*b*, 72*c*) of sifter attachment 14 can include additional components, such as structure to stabilize motion of components therein, such as would be well known in the art.

During use, and upon connection of sifter attachment 14 to mixer 12, the combined mixer/sifter is utilized with bottom surface 40 facing sideways (not down) so that sifter cup 80 can be filled with any appropriate substance (e.g., sugar) to be sifted. This is in contrast to when mixer 12 is used as a typical mixer (e.g., when beaters 50*a* and 50*b* are attached), at which point bottom surface 40 is positioned facing down to carry out mixing of ingredients in a bowl. After a substance to be sifted is placed in sifter cup 80, mixer 12 is turned on utilizing buttons 20 which, in turn, causes coupler rod 70 to rotate at a relatively high rate of rotation. The gear mechanism of the sifter attachment in turn drives sifter beater 82 to rotate at a relatively slow rate of rotation thus causing the inserted substance to be sifted through screen 84. When completed, mixer 12 is turned off. Finally, eject button 22 is depressed to disconnect sifter attachment 14 from mixer 12.

As described above, the combination mixer/sifter of the present invention includes two main components, mixer 12 and sifter attachment 14. Mixer 12 is of a design similar to that of existing electric hand mixers. Moreover, mixer 12 operates in a manner identical to that of existing electric hand mixers and may be used with typical beaters (e.g., 50*a*, 50*b*) and operated in a manner well known in the art. When mixer 12 is coupled to the sifter attachment of the present invention, the combined device enables for sifting in a manner not previously contemplated. Sifter attachment 14 efficiently enables for electric sifting utilizing a hand mixer and detaches from the mixer for easy cleaning and storage. Sifter attachment 14 is relatively compact and generally is of a size relatively comparable to that of the mixer. However, sifter attachment can be designed so that the sifter cup can be larger or smaller than that shown in the drawings. Thus, sifter attachment can be relatively large to accommodate a large volume sifter cup but, at the same time, be designed in accordance herein to be used with a relatively small hand mixer. Conversely, sifter attachment can be designed to be relatively small if small sifting tasks are only needed, by providing a relatively small sifter cup 80.

Moreover, and in accordance with another embodiment of the present invention, the sifter attachment can include a detachable sifter cup (not shown) which includes primarily a cup for holding the substance to be sifted and the sifter beater. In such case, the detachable sifter cup can be attached to mixer 12 via a sifter adapter (not shown) which is comprised primarily of a coupler rod (equivalent to coupler rod 70), a front panel (equivalent to panel 60), a gear mechanism (equivalent or similar to gears 72a, 72b, 72c), and a body including rear and side panels. Here, the rear panel of the sifter adapter may have a surface device similar to the bottom surface (including surfaces 40, 42) of mixer 12, and the detachable sifter cup may include a connecting surface similar to the front plate 60 of the sifter attachment 14. Further, the sifter beater disposed within the detachable sifter cup may include a connecting end that extends out from the sifter cup and has a design similar to coupler rod 70. Of course, other designs of such a detachable sifter cup and sifter adapter are possible.

The sifter attachment of the present invention may include a flat front plate 60, or other suitable design, so that it can be coupled to existing electric, hand mixers.

While the present invention has been particularly shown and described in conjunction with a preferred embodiment thereof, it will be readily appreciated by those of ordinary skill in the art that various changes may be made without departing from the spirit and scope of the invention. For example, while a particular gear mechanism has been shown and described to include three gears 72a, 72b and 72c, the present invention is not limited to this design and may include other mechanisms, and/or additional or fewer gears that carry out the same function as that described herein.

As another example, the present invention is not limited to the specific designs shown in the drawings. For example, the sifter cup may have a different shape than that shown.

Therefore, it is intended that the appended claims be interpreted as including the embodiments described herein, the alternatives mentioned above, and all equivalents thereto.

What is claimed is:

1. An apparatus for performing a mixing and a sifting function, comprising:
   a mixing base structure, including:
      a top portion having a handle disposed thereon; and
      a bottom portion having a planar bottom surface;
      wherein said planar bottom surface includes a protruding surface substantially covering said planar bottom surface, said protruding surface containing a first aperture adapted to receive one of mixing and sifting attachments.
2. The apparatus of claim 1, further comprising:
   a sifting attachment including:
      a coupler;
      wherein said coupler is passed through said first aperture in said mixing base structure and attaches said sifting attachment to said bottom surface of said mixing base structure.
3. The apparatus of claim 2, wherein said sifting attachment further comprises:
   a sifter beater; and
   a screen;
   wherein said sifter beater and said screen are disposed in said container portion.
4. The apparatus of claim 3, wherein said sifting attachment includes:
   a gear mechanism which couples said coupler to said sifter beater, such that said mixing base structure can rotate said sifter beater.
5. The apparatus of claim 4, wherein said gear mechanism is adapted to rotate said sifter beater at a rate of rotation less than a rate of rotation of said coupler.
6. The apparatus of claim 2, wherein said coupler is a coupler rod.
7. The apparatus of claim 1, wherein said mixing base structure is a hand-held electric mixer.
8. An apparatus for performing a mixing and a sifting function, comprising:
   a mixing base structure, including:
      a top portion having a handle disposed thereon; and
      a bottom portion having a planar bottom surface;
      wherein said bottom surface includes a protruding surface containing a first aperture adapted to receive one of mixing and sifting attachments;
   a sifting attachment including:
      a coupler;
      wherein said coupler is passed through said first aperture in said mixing base structure and attaches said sifting attachment to said bottom surface of said mixing base structure; and
   wherein said sifting attachment comprises:
      a container portion; and
      a front plate;
      wherein said front plate contains a recess, such that said protruding surface of said mixing base structure is disposed and fitted within said recess to connect said sifting attachment to said mixing base structure.
9. The apparatus of claim 8, wherein said mixing attachment comprises:
   at least one beater disposed within said first aperture of said mixing base structure and connected thereto.
10. The apparatus of claim 8, wherein said front plate includes a second aperture such that said coupler passes through said second aperture in said front plate and connects said sifting attachment to said mixing base structure.
11. The apparatus of claim 10, wherein said coupler passes through said first aperture in said mixing base structure to connect said mixing base structure and said sifting attachment.
12. A sifting attachment for a mixing apparatus, comprising:
   a container portion;
   a front plate disposed along a vertical direction of said container portion, said front plate having a planar surface containing a recess which substantially covers said planar surface, and an aperture disposed within said recess; and
   a coupler rod protruding from said container portion;
   wherein said coupler rod extends in a horizontal direction from said container portion through said aperture in said recess and away from said front plate, and said coupler rod is adapted to attach to the mixing apparatus.
13. The apparatus of claim 12, further comprising:
   a sifter beater; and
   a screen;
   wherein said sifter beater and said screen are disposed in said container portion.
14. The apparatus of claim 13, wherein said sifting attachment includes:
   a gear mechanism which couples said coupler to said sifter beater, such that sifter beater is rotated by the mixing apparatus.
15. The apparatus of claim 14, wherein said gear mechanism is adapted to rotate said sifter beater at a rate of rotation less than a rate of rotation of said coupler.

16. A sifting attachment for a mixing apparatus, comprising:
- a container portion;
- a front plate containing a recess and an aperture disposed within said recess; and
- a coupler;

wherein said coupler extends through said aperture from said recess of said front plate, and said coupler is adapted to attach to the mixing apparatus; and wherein said recess is adapted to receive a protruding surface of the mixing apparatus.

* * * * *